(12) United States Patent
Shaw

(10) Patent No.: US 9,820,138 B2
(45) Date of Patent: Nov. 14, 2017

(54) METHOD AND APPARATUS FOR RESOURCE MANAGEMENT IN A COMMUNICATION SYSTEM

(71) Applicant: AT&T Intellectual Property I, LP, Atlanta, GA (US)

(72) Inventor: Venson Shaw, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 283 days.

(21) Appl. No.: 14/520,418

(22) Filed: Oct. 22, 2014

(65) Prior Publication Data
US 2016/0119913 A1    Apr. 28, 2016

(51) Int. Cl.
| | |
|---|---|
| H04W 8/06 | (2009.01) |
| H04M 11/00 | (2006.01) |
| G06F 15/16 | (2006.01) |
| H04L 29/06 | (2006.01) |
| H04L 29/12 | (2006.01) |

(52) U.S. Cl.
CPC ........... *H04W 8/06* (2013.01); *H04L 61/1511* (2013.01)

(58) Field of Classification Search
CPC .......... H04L 61/15; H04W 8/00; H04W 72/04
See application file for complete search history.

(56) References Cited

U.S. PATENT DOCUMENTS

| | | | | |
|---|---|---|---|---|
| 7,231,638 | B2 * | 6/2007 | Blackmore | G06F 9/544 709/212 |
| 7,949,660 | B2 * | 5/2011 | Green | G06F 17/30038 707/737 |
| 7,970,937 | B2 | 6/2011 | Shuster et al. | |
| 8,150,975 | B2 * | 4/2012 | Li | H04L 65/608 709/227 |
| 8,184,596 | B2 * | 5/2012 | Karlsson | H04W 16/14 370/335 |

(Continued)

FOREIGN PATENT DOCUMENTS

| | | |
|---|---|---|
| AU | 2010101079 A4 | 11/2010 |
| WO | WO0114985 A1 | 3/2001 |

OTHER PUBLICATIONS

Doelitzscher, et al., "ViteraaS: Virtual cluster as a service." Cloud Computing Technology and Science (CloudCom), 2011 IEEE Third International Conference on. IEEE, 2011.

(Continued)

*Primary Examiner* — Xavier Szewai Wong
(74) *Attorney, Agent, or Firm* — Guntin & Gust, PLC; Ralph Trementozzi

(57) ABSTRACT

Aspects of the subject disclosure may include, for example, a method including identifying, by a system including a processor, a second subtask from a first subtask to generate a collective task to be performed for a communication device and determining, by the system, a bearer path for enabling the first resource to coordinate with the second resource to perform the collective task. The first subtask and the second subtask are associated with a first resource and a second resource identified from a database of available resources for performing the collective task. The first resource performs the first subtask, and the second resource performs the second subtask. Other embodiments are disclosed.

19 Claims, 7 Drawing Sheets

(56) References Cited

U.S. PATENT DOCUMENTS

| | | | |
|---|---|---|---|
| 8,234,348 B1* | 7/2012 | Tulchinsky | H04L 67/34 709/214 |
| 8,572,247 B2 | 10/2013 | Larson et al. | |
| 8,739,243 B1* | 5/2014 | Martini | H04L 63/1466 709/218 |
| 9,031,531 B2* | 5/2015 | Miluzzo | H04W 4/08 370/338 |
| 2010/0185614 A1 | 7/2010 | O'Brien et al. | |
| 2011/0119381 A1* | 5/2011 | Glover | G06F 9/5072 709/226 |
| 2013/0311661 A1 | 11/2013 | McPhee | |
| 2013/0326063 A1 | 12/2013 | Burch et al. | |
| 2014/0258417 A1* | 9/2014 | Archer | G06F 11/30 709/205 |

OTHER PUBLICATIONS

Kamilaris, et al., "Exploring the Use of DNS as a Search Engine for the Web of Things." Internet of Things (WF-IoT), 2014 IEEE World Forum on. IEEE, 2014.

* cited by examiner

200

400

METHOD AND APPARATUS FOR RESOURCE MANAGEMENT IN A COMMUNICATION SYSTEM

FIELD OF THE DISCLOSURE

The subject disclosure relates to a method and apparatus for resource management in a communication system.

BACKGROUND

Communication systems, such as a mobile communications system, can be used for providing various services, including voice, video and/or data services, and user location information can be important for next generation IP multi-media services provided by telecommunication systems. As the number of users and their service requirements increase, the load on the network increases. Infrastructure expansion and improvement can lessen the network load but is costly.

BRIEF DESCRIPTION OF THE DRAWINGS

Reference will now be made to the accompanying drawings, which are not necessarily drawn to scale, and wherein.

DETAILED DESCRIPTION

Figure 1:
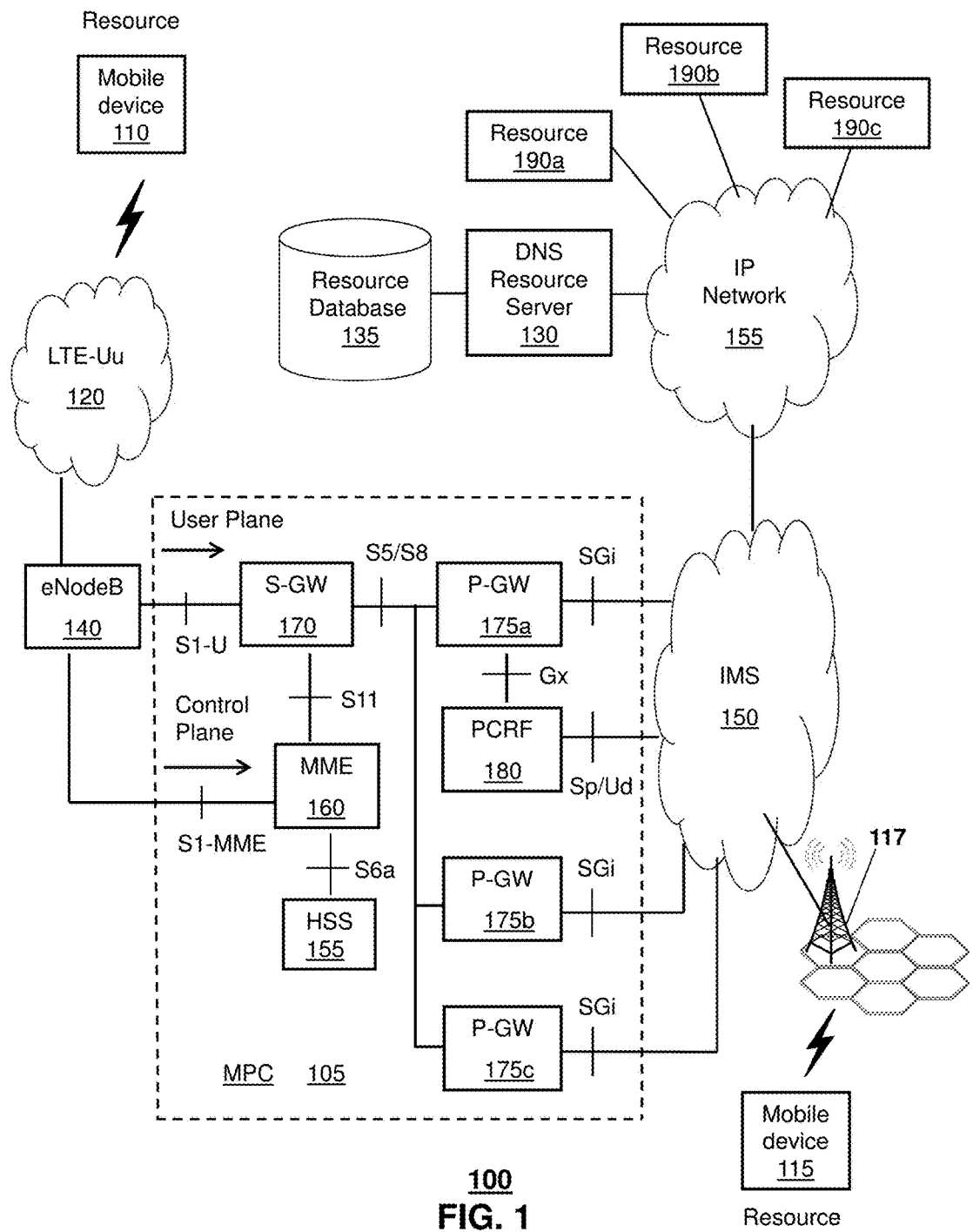
FIG. 1 depicts illustrative embodiments of a system for managing resources for mobile devices in a communication network.

The subject disclosure describes, among other things, illustrative embodiments for managing and leveraging resources for use by mobile devices in a communication network. One or more aspects of the subject disclosure include a domain name server (DNS) can be used to discover and access resources for use by a mobile device. The resources can be provided by devices and systems that are remote from the mobile device, such that the mobile device can benefit from operations of remote devices while minimizing hardware and software requirements at the mobile device. The DNS server can identify resources that are network-centric, or cloud-based, services. The DNS server can also identify resources resident at other mobile devices in a communication network. Resource information can be maintained by the DNS server in a searchable database. Responsive to request from the mobile device, the DNS server can provide network address information to the mobile device and can provide an access point name (APN) to a mobility management entity (MME) for establishment of a bearer path to the resource.

The DNS server can break down a task or function that has been requested by a mobile device into subtasks that can be combined. The DNS server can identify resources, which can perform the subtasks in a collaborative fashion to complete the task. The DNS can provide access to these resources to the mobile device such that the combination of remote resources can provide requested task. The DNS server can monitor utilization and availability information for resources that are provided to the mobile device. The DNS server can use this information to perform load-balancing and/or fall over for these resources.

One embodiment of the subject disclosure includes a domain name server device comprising a memory to store executable instructions and a processor. The processor, responsive to executing the executable instructions, can perform operations including receiving from a mobile communication device over a network a request including a description of a task to be performed for the mobile communication device. The processor can also perform operations including identifying, via a resource database, a first resource and a second resource according to the description of the task. The first resource can coordinate performance of the task with the second resource. The processor can further perform operations including sending a network address to the mobile communication device for accessing the first resource via the network.

One embodiment of the subject disclosure includes a computer-readable storage device, comprising executable instructions. The executable instructions can cause a processor to perform operations including identifying a first sub-function and a second sub-function to perform a collective function for a mobile device. The executable instructions can also cause the processor to perform operations including identifying, via a resource database, a first resource for performing the first sub-function and a second resource for performing the second sub-function. The function can be performed by coordination use of the first resource and the second resource. The executable instructions can further cause the processor to perform operations including sending a second network address to the mobile communication device for accessing the third resource via the network.

One embodiment of the subject disclosure includes a method including identifying, by a system including a processor, a task from a second subtask from a first subtask to generate a collective task to be performed for a communication device. The first subtask and the second subtask can be associated with a first resource and a second resource identified from a database of available resources for performing the collective task. The method can include determining, by the system, a bearer path for enabling the first resource to coordinate with the second resource to perform the collective task, wherein the first resource performs the first subtask. the second resource can perform the second subtask.

In FIG. 1, a mobile communication system 100 is illustrated that can provide wireless communication services, including voice, video and/or data services to mobile devices 110. System 100 can enable wireless communication services over a number of different networks, such as between a mobile device 110 and other communication devices 115 and/or resources 190a-c or services. Mobile devices 110 are movable from location to location, while remaining wirelessly connected to the system 100 via various wireless communication assets of the system 100. Mobile devices 110 can include a number of different types of devices that are capable of voice, video and/or data communications, including cellular phones, smartphone, a personal computer, media processing devices, and so forth.

In one or more embodiments, in addition to the mobile device 110, the system can include a Long-Term Evolution (LTE) Radio Access Technology (RAT) network (LTE-Uu network) 120, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. The LTE-Uu network 120 provides radio communication assets for wireless connectivity between the mobile device 110 and the Mobile Packet Core (MPC) 105 of the system 100. The LTE-Uu network 120 can also enable connectivity between the end user devices 110 and 125 and the MPC 105. The LTE-Uu network 120 can utilize a number of interfaces, including Iu, Uu, Iub and/or Iur.

In one or more embodiments, the LTE-Uu network 120 can be coupled to an eNodeB 140 and can carry many traffic types including IP-based packet switched traffic. In one or more embodiments. An E-UTRAN-based LTE-Uu 120 can include one or more eNodeB nodes on the network that are connected to each other such as via X2 interfaces and which are further connectable to the MPC network 105 via an S1-U interface. For example, E-UTRAN-based LTE-Uu 120 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, an eNodeB 140 can include an air interface to the LTE-Uu network 120 and network interfaces to the MPC 105. The air interface can support an E-UTRAN-based LTE-Uu network 120, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface can enable the eNodeB 140 to receive requests for connection to the system 100 from various types of devices, including mobile devices 110. In one or more embodiments, the network interfaces of the eNodeB 140 can support communication to the MPC 105.

In one or more embodiments, the eNodeB 140 can receive a connection request from a mobile device 110. The eNodeB 140 can perform operations consistent with the 3GPP standard. In one or more embodiments, the eNodeB 140 can request authentication for the mobile device 110. In one embodiment, the eNodeB 140 can forward a connection request from the mobile device 110 to the MME 160. An authentication request can be completed as a control plan function for the mobile device 110. For example, the eNodeB 140 can forward an authentication request from a mobile device 110. In one embodiment, when a mobile device 110 is booted up, the mobile UE device 110 can send the authentication request to the MME 160 via eNodeB 140.

In one or more embodiments consistent with the 3GPP standard, the Home Subscriber Server (HSS) 155 can be provided by a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments consistent with the 3GPP standard, where the HSS 155 returns a successful authentication of the mobile UE device 110, the MME 160 can perform additional control plane functions for the benefit of the mobile UE device 110. In one embodiment, the MME 160 can assign one or more bearer gateways 170 and 175*a-c* for use in transporting user data to and from the mobile UE device 110. For example, the MME 160 can assign default and dedicated bearer gateways 170 and 175*a-c*. In one embodiment, a default bearer gateway can provide a default pathway for control and signal messages between the mobile device 110 and the MPC related to operation of the mobile device 110 and the MPC 105. In one embodiment, a dedicated bearer gateway can provide a pathway for critical signals, such as voice over internet (VoIP), where a guaranteed quality of service (QOS) must be provided. Hence, the MME 160 can perform assignment, creation, deletion, and/or maintenance of bearer gateways 170 and 175*a-c* for the mobile device 110.

In one or more embodiments consistent with the 3GPP standard, after the MME 160 has performed assignment of bearer gateways 175*a-c* for the mobile device 110, the MME 160 can further perform updates and handovers on behalf of the mobile device 110 as the mobile device 110 moves between various LTE-Uu wireless network 120 locations. The MME 160 can assign initial bearer gateways 175*a-c* for the mobile UE device 110 based on location information and QoS information associated with the mobile UE device 110. However, if the mobile UE device 110 moves to a different location, or if the mobile UE device 110 acquires a different QoS requirement, then the MME 160 can be required to update the assignment of the bearer gateways 170 and 175 to fulfill performance requirements. Hence, the MME 160 can assign and maintain bearer pathways for user data for the mobile UE device 110.

In one or more embodiments consistent with the 3GPP standard, the MME 160 can perform functions such as idle mode tracking and paging procedure including retransmissions. The MME 160 can also choose a serving gateway 170 for the mobile device 110 such as at the initial attach and at time of intra-LTE handover involving node relocation. MME 160 and HHS 155 can be accessed when the end-user device 110 attempts to re-register to user E-UTRAN 120 to access the core network 105. In one embodiment, after the eNodeB 140 and the MME 160 have established a tunneling link for the mobile device 110, the session can be maintained indefinitely.

In one or more embodiments according to the 3GPP standard, a Serving Gateway (S-GW) 170 can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and P-GW 175). For a mobile device 110 in idle state, the S-GW 170 can terminate a downlink data path and can trigger paging when downlink data arrives for the mobile device 110. The S-GW 170 can manage and can store mobile device 110 contexts, such as parameters of an IP bearer service and/or network internal routing information.

In one or more embodiments consistent with the 3GPP standard, a PDN Gateway (P-GW) 175*a-c* can provide connectivity from the mobile device 110 to external packet data networks by being the point of exit and entry of traffic for the mobile device 110. The mobile device 110 can have simultaneous connectivity with more than one P-GW 175a-c for accessing multiple PDNs. The P-GW 175 can perform policy enforcement, packet filtering for each user, charging support, lawful interception and/or packet screening. The P-GW 175 can also act as the anchor for mobility between 3GPP and non-3GPP technologies such as WiMAX and 3GPP2 (CDMA 1× and EvDO).

In one or more embodiments consistent with the 3GPP standard, a Policy Control Resource Function (PCRF) 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network.

In one or more embodiments, the communication system 100 can provide access to an IP Multimedia Subsystem 150 that can further provide access to an IP Network 155. The IMS 150 network architecture can facilitate access to other mobile device 115 and other communication devices via packet-switched and/or circuit switched networks. For example, the mobile device 110 can communicate with a second communication device 115 via the IMS 150 via one or more base stations 117. The IMS 150 can further provide access to the IP network 155 for bi-directional communications with network elements via the world-wide web (www).

In one or more embodiments, the mobile device 110 can attempt to access resources, services, and/or devices via the IP network 155 using domain name addressing. For example, an internet browser application at the mobile device 110 can be used to enter and/or search for a domain name for a website that is of interest to a user of the mobile device. The user can, for example, enter or select a website domain name using a uniform resource locater format, such as www.espn.com." The URL version of the domain name provides a memorable textual name for the website for the benefit of both the user and the owner of the domain name. However, to access the network server device that, in fact, hosts the website represented by the URL, "www.espn.com," the mobile device 110 needs to provide a numerical, IP address to the IP Network 155, where the IP address is in the form of a dot-decimal number, such as "172.16.254.1." There are many millions of numerical IP addresses in use in the world-wide web, some of which are static (unchanging) while others are dynamic (changing). It is, therefore, not practical to store all of the potentially useful IP addresses at the mobile device 110. Therefore, the mobile device 110 must obtain the actual, numerical IP address from a domain name server, or DNS.

In one embodiment, the communication network 100 can include a domain name server (DNS) resource server 130. The DNS resource server 130 can provide services for converting a domain name to an IP address, as described above. In response to a DNS query with domain name from a mobile device 110, the DNS resource server 130 can return an IP address corresponding to the domain name. In one or more embodiments, the DNS resource server 130 can further provide services for searching and discovering one or more resources 190a-c that are accessible via the IP network. In one embodiment, rather than transmitted a URL of a domain name for a website or service, the mobile device 110 can transmit a request for a task or function. For example the mobile device 110 can transmit a request including a description, such as a "navigator" or a "driving map for restaurants." In one or more embodiments, the DNS resource server 130 can use the description of the task, or function, to search for a suitable resource 190a-c to fulfill the request.

In one or more embodiments, the DNS resource server 110 can access a resource database 135 that information describing resources 190a-c that are accessible via the IP network 155. The resource database 135 can include capabilities, requirements, and/or input/output characteristics for the tasks, functions, and/or capabilities available at the resources 190a-c. For example, a resource 190a can include a navigation function, which operates at the resource 190a while making graphical information associated with the navigation available for remote use. The DNS resource server 130 can receive a request from a mobile device 110 that includes a request for a task that is described as, "driving navigator." The DNS resource server 130 can search the resource database 135 for any remote resource matching this description. In this example, the resource database 135 can match the navigation function of the resource 190a with the requested task. The DNS resource server 130 can return the IP network address for the resource 190a to the mobile device 110. The mobile device 110 can use the IP network address to access the remote navigation function from the resource 190a, such that the mobile device 110 can provide the navigation function yet only be required to execute a graphical user interface front-end application at the mobile device 110. The bulk of the navigation application and required map database can be stored and operating at the resource 190a. The mobile device 110 can thereby achieve high-end features without the commitment of high-end resources in the mobile device 110.

In one or more embodiments, DNS resource server 130 can determine that more than one resource 190a-c is available for use in providing the requested task to the mobile device 110. For example, the mobile device 110 can request a "driving map for restaurants." The DNS resource server 130 can search the information at the resource database 135 and determine that none of the available resources 190a-c is quite capable of performing the requested task. In one or more embodiments, the DNS resource server 130 can include a capability for decomposing or breaking down the requested task into two or more subtasks. For example, the DNS resource server 130 can break down the requested task, "driving map for restaurants" into subtasks for "navigation" and "restaurant recommendations." The DNS resource server 130 can use these subtasks for a second search of the resource database 135.

In one or more embodiments, in the second search of the database, the DNS resource server 130 can look not only for the subtasks that have been extracted via decomposition of the requested task but also for a subtask that is capable of collaborating between subtasks. For example, the DNS resource server 130 can search for subtasks for "navigation" and "restaurant recommendations" where either of the subtasks is capable of collaborating with the other subtask or where a third "collaborative" subtask is capable of "gluing" the subtasks together. In one example, the DNS resource server 130 can identify a first resource 190a that is capable of a "navigation" subtask and a second resource 190b that is capable of a "restaurant recommendation" subtask. The DNS resource server 130 can further determine that the "navigation" subtask is capable of incorporating a list of local businesses into the navigation process, such that navigation process can handle the "collaboration" between the subtasks that can provide the essential elements of the request task. In one embodiment, the DNS resource server 130 can identify a subtask that can be used for governing the collaboration between the "navigation" subtask and the "restaurant recommendation" subtask. For example, the "collaboration" subtask can be an application programming interface (API) that can transfer information between the "navigation" subtask operating at a first resource 190a and the "restaurant recommendation" subtask operating at a second resource 190b.

In one or more embodiments, the DNS resource server 130 can send a response to the mobile device 110 that includes an IP address for the both the first resource 190a and the second resource 190b. The mobile device 110 can then communicate directly with the first and second resources 190a-b to send/receive information for use in providing the collaborated task to the user of the mobile device 110. In one embodiment, the DNS resource server 130 can provide the IP address of the resource 190a for the subtask that the can be responsible for the collaboration of the subtasks. For example, the DNS resource server 130 can provide the IP address for the "navigation" subtask, where this subtask bears responsibility for the collaboration between subtasks. In another example, the DNS resource server 130 can simply provide the IP address of a third resource 190c that performs the collaboration between the "navigation" subtask of a first resource 190a and the "restaurant recommendation" subtask of the second resource 190b.

In one or more embodiments, the DNS resource server 130 can include capability for providing an access point name (APN) to the mobile device 110. The APN can be gateway through which the mobile device 110 can access a resource 190a via the IP network 155. In one embodiment, the DNS resource server 130 can analyze information from the MPC 105 and the from the IP network 155 to determine the available pathways between the mobile device 110 and any particular resource 190a that the DNS resource server 130 has selected for performance of a requested task. The DNS resource server 130 can further determine which of the available data paths is best suited for supporting communications between the mobile device 110 and the resource 190a. For example the DNS resource server 130 can determine that a "navigation" task that is operating at resource 190a should provide a navigation function for the mobile device 110. In one or more embodiments, the DNS resource server 130 can further determine that there are several available PDN gateways 175a-c, that are theoretically available at the MPC 105 for supporting communications between the mobile device 110 and the resource 190a. The DNS resource server 130 can select a preferred P-GW 175b as the bearer path for the communications. For example, the DNS resource server 130 can analyze information from the MPC 105 to determine that P-GW 175b is the preferred gateway for accessing the resource 190a. In another embodiment, the DNS resource server 130 can provide the IP address of the resource 190a, and the MPC can determine which bearer gateway 175b should be used. In one embodiment, where the DNS resource server 130 selects a preferred bearer gateway 175b, the DNS resource server 130 can communicate this selection to the MME 160 of the MPC 105 that services the mobile device 105. The MME 160 can establish the bearer gateway 175b for the mobile device 110 based on the received information.

In one or more embodiments, where a DNS resource server 130 selects multiple resources 190a-c to provide tasks for the benefit of a mobile device 110, the DNS resource server 130 can further select multiple bearer pathways 175a-c, or pipes, for handling communications between the mobile device 110 and the resources. For example, the performance of a task for "driving map for restaurants" can require several subtasks operating at several resources 190a-c. While all of the resources 190a-c can be, theoretically, accessed via the world-wide web, in fact, each resource 190a can have unique communication paths, and a certain communication path can be better associated with a certain bearer gateway 175a.

In one or more embodiments, the DNS resource server 130 can facilitate sharing resources between mobile devices 110 and 115. In one embodiment, the DNS resource server 130 can access information from the resource database 135 describing functions that are available at a first mobile device 110 and a second mobile device 115. For example, the first mobile device 110 can have a tool or application for finding restaurant coupons on-line, while the second mobile device 115 can have an application for accessing up-to-the-minute traffic conditions in a particular city. To extend the previous example, if the first mobile device 110 requests a "driving map for restaurants with traffic aids and specials," then the DNS resource server 130 can break down the requested task into subtasks such as "navigation," "restaurant recommendations," "traffic aid," and "coupons/specials for restaurants." The DNS resource server 130 can, again, identify network or cloud-based resource 190a and 190b for a "navigation" subtask and a "restaurant recommendation subtask." However, the DNS resource server 130 can also identify the non-cloud-based applications at the mobile devices 110 and 115, including at the requesting mobile device 110, so that the "traffic aids" subtask at a remote mobile device 115 is combined with the "navigation" and "restaurant recommendation" subtasks from the networked devices 190a-b and the "coupon/specials for restaurants" subtask as the mobile device 110. Again, the collaboration of these subtasks can be performed via a collaboration subtask at a resource 190c that can be identified via the resource database 135. The result is a distributed task that is performed using a group of devices 110, 115, and 190a-c, for the benefit of the requesting mobile device 110. In another embodiment, a requesting mobile device 110 can benefit from tasks and/or subtasks that are identified and organized by the DNS resource server 130, while simultaneously executing its own resources and sharing these resources with a different, remote mobile device 115.

In one or more embodiments, the DNS resource server 130 can receive information from resources 115 and 190a-c regarding utilization and/or availability of these resources. The DNS resource server 130 can receive information from resources 115 and 190a-c that have been assigned to requesting mobile devices 110. For example, the DNS resource server 130 can organize a task for a "driving map for restaurants" based on first and second resources 190a-b for a first mobile device 110. At the same time, the navigation application at the first resource 190a can be in use by a group of other users and/or the second resource 190b that hosts the restaurant recommendation engine can be undergoing maintenance. These events can adversely affect the performance of the subtask in a way that will be detrimental to the user of the mobile device 110. The DNS resource server 130 can detect availability issues with respect to these resources 190a-b by monitoring performance, status, and/or notifications associated with these resources 190a-b. For example, the DNS can detect information such as overloading, active/inactive state, breakdown, notifications, and/or idle state. Where the DNS resource server 130 detects issues or potential issues with overloading and/or non-availability, the DNS resource server 130 can determine if an alternative exists for balancing the load. For example, the DNS resource server 130 can detect that the navigator subtask from the first resource 190a is overloaded. In turn, the DNS resource server 130 can determine from the resource database 135 whether a second navigator application is available at a third resource 190c to take on part of the work. In one embodiment, the DNS resource server 130 can select the secondary navigation application and can send an IP address for the third resource 190c to the mobile device 110. In another embodiment, the DNS resource server 130 can direct a collaborating subtask to use the second navigation application.

In one or more embodiments, the DNS server 130 can store information regarding available resources 115 and 190a-c at the resource database 135. The DNS resource server 130 can store information including capabilities, requirements, and/or input/output characteristics for the tasks, functions, and/or capabilities available at the resources 190a-c. In one embodiment, the DNS resource server 130 can continuously maintain the resource database 135 so the data is dynamically updated. In one embodiment, the DNS resource server 130 can update or alter one or more selections of subtasks for performing a task based on information that is dynamically updated with respect to these resources. For example, a resource 190a could add a new capability or could dramatically improve performance. The DNS resource server 130 can respond to this new information by substituting the resource 190a for a previously-selected resource 190c.

Figure 2A:
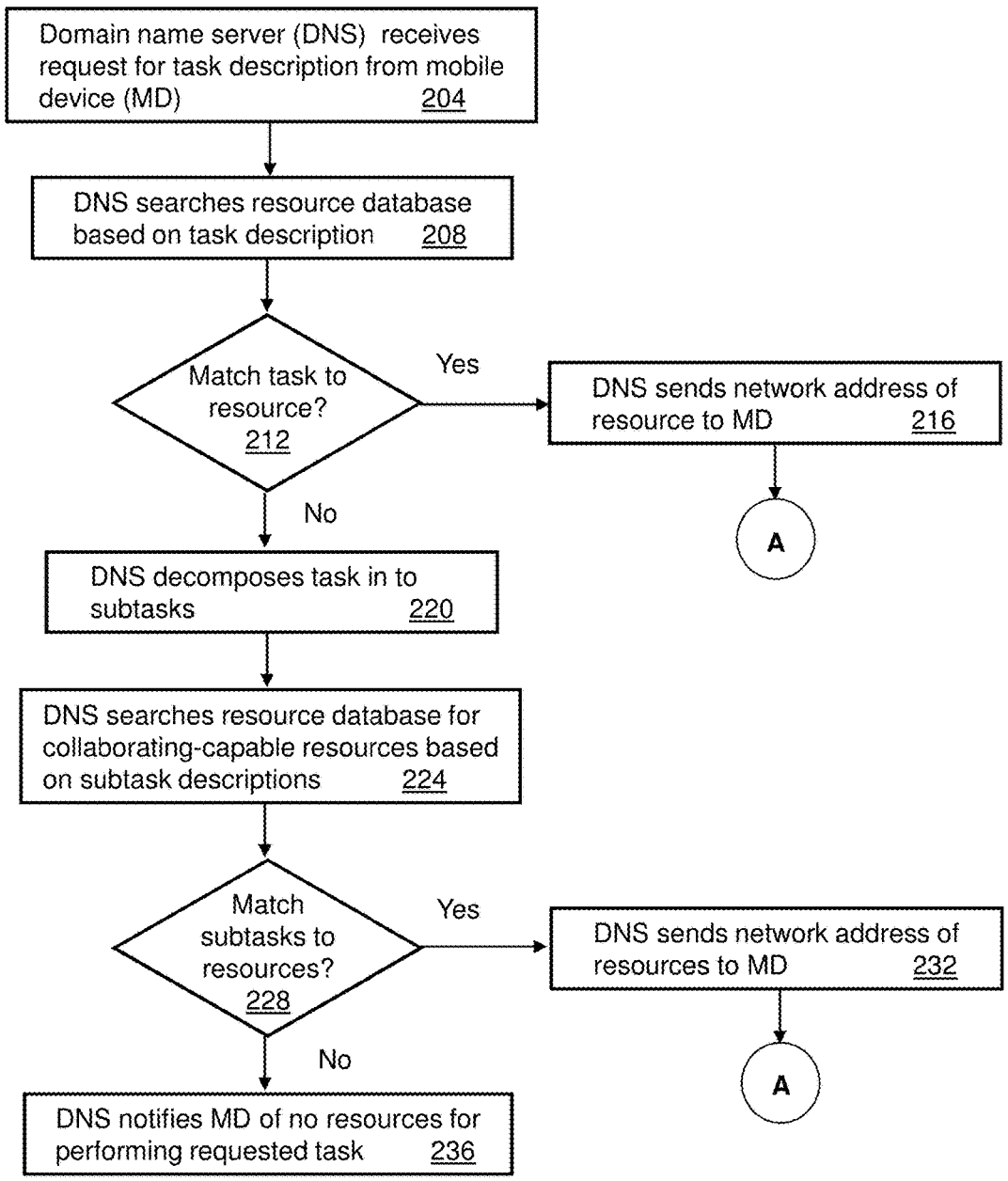
FIGS. 2A-2B depicts illustrative embodiments of a method used in portions of the system described in FIGS. 1 and 3-4.
Figure 2B:
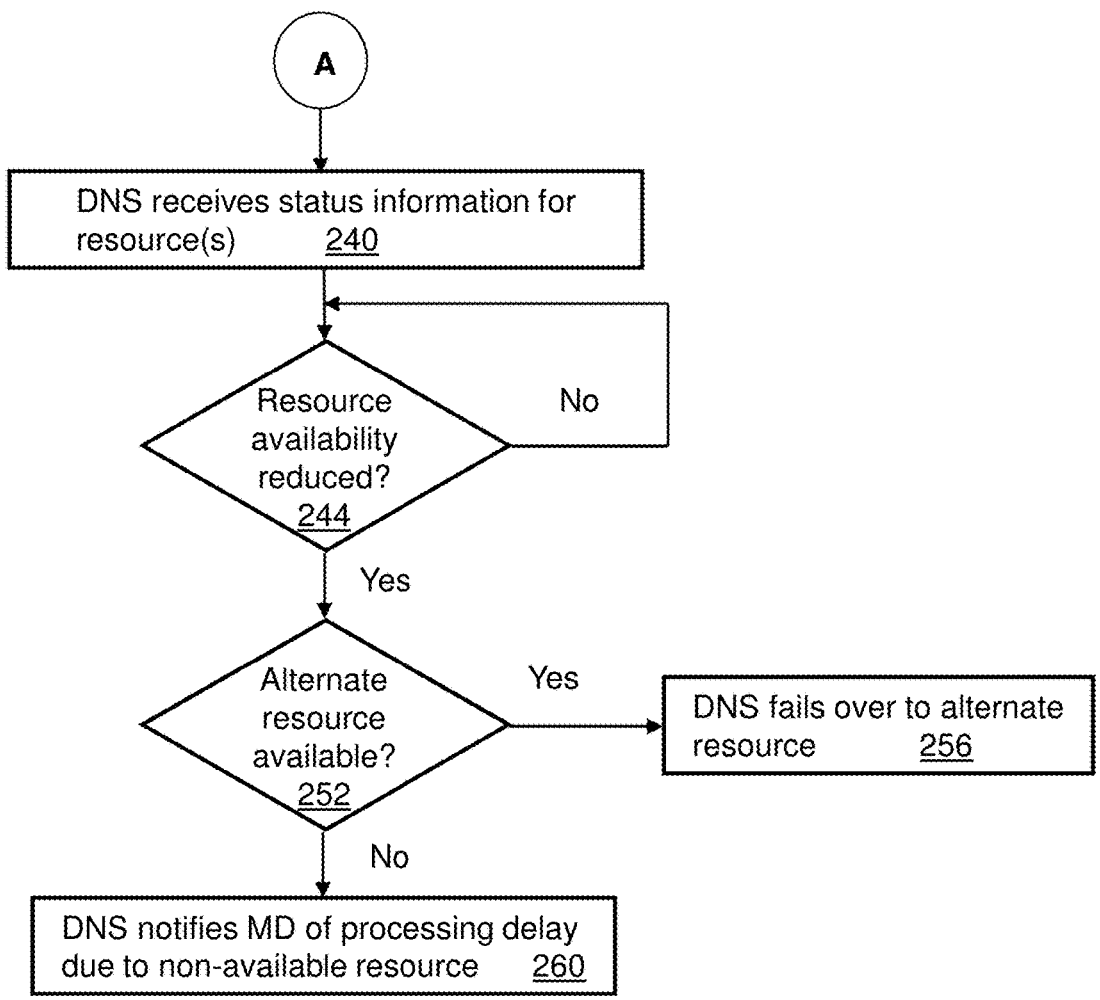
Figure 3:
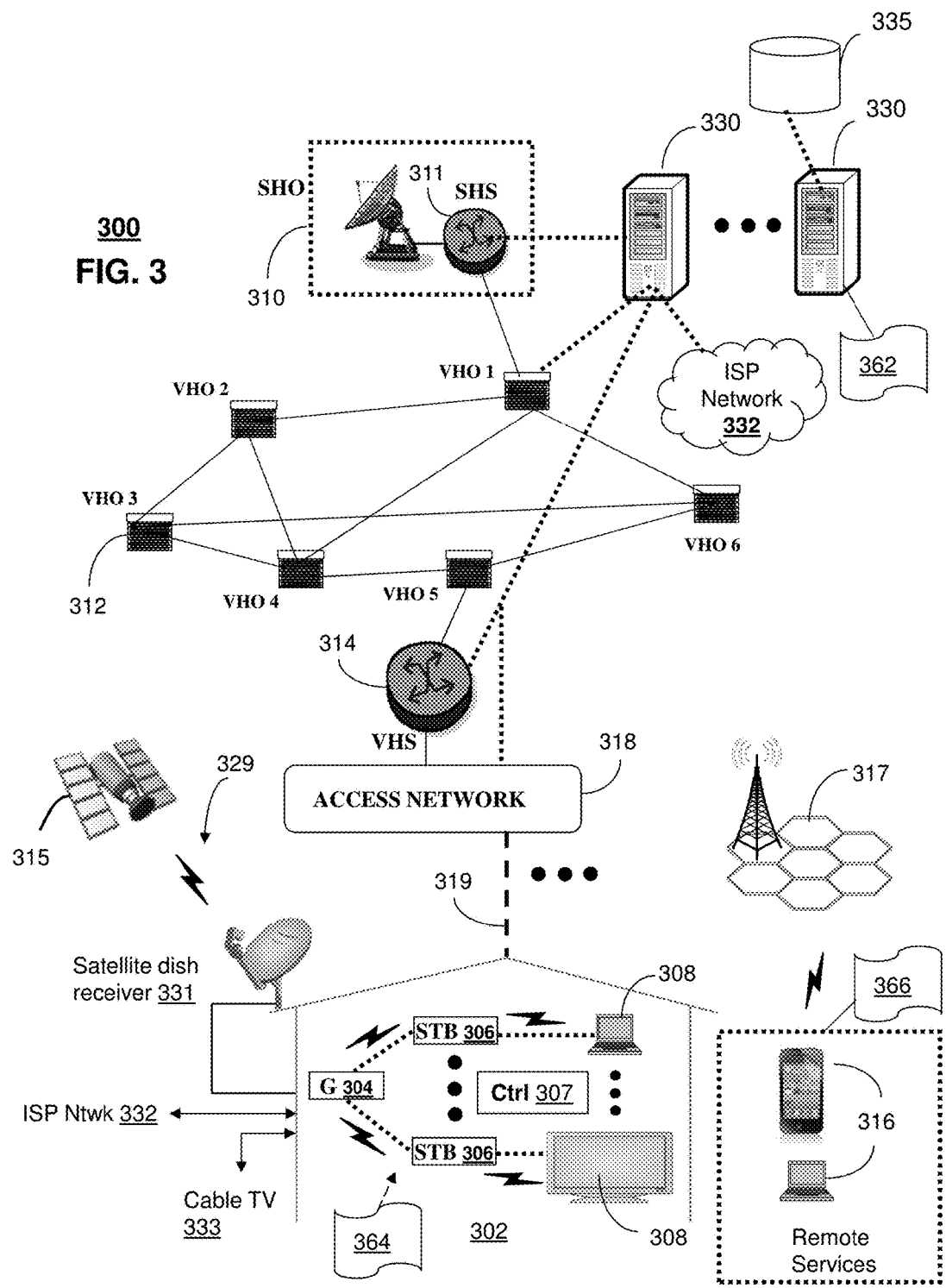
FIGS. 3-4 depict illustrative embodiments of communication systems that provide communication and media services for communication devices according to embodiments illustrated in FIG. 1.
Figure 4:
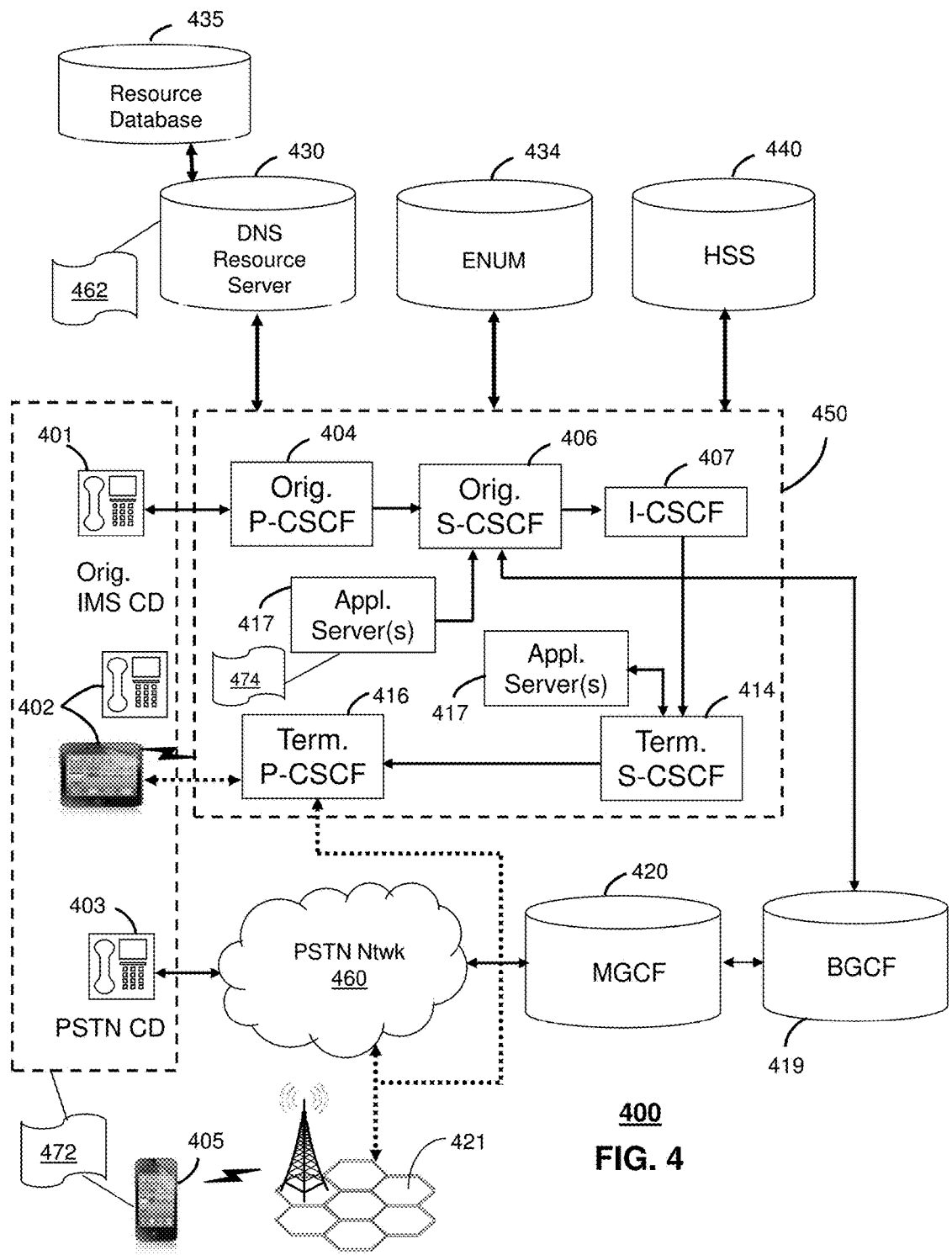

FIGS. 2A-2B depicts illustrative embodiments of a method used in portions of the system described in FIGS. 1 and 3-4. Method 200 can begin with a DNS resource server 130 receiving a task description from a mobile device 110. The mobile device 110 can provide a textual description of a task that can be performed at a device other than the mobile device 110 for the benefit of the mobile device 110. The description can be part of a request from the mobile device 110 and/or can be part of a response by the mobile device 110 to an inquiry regarding a needed task.

At step 208, the DNS resource serve 130 can search a resource database 135 base on the task description. The search can be based on a textual description. In one embodiment, the search can use keywords extracted and/or derived from the task description. The resource database 135 can in textual descriptive language describing capabilities and requirements of tasks that are available from resources 190a-c that can execute these tasks for the benefit of the mobile device 110.

At step 212, the DNS resource server can determine if the described task matches an available resource. If a match is found, then the DNS resource server 130 can send a network address for the resource to the mobile device 110 at step 216. The mobile device 110 can then access the resource at the IP address that is specified. If no match is found at the resource database 135 at step 212, then the DNS resource server 130 can breakdown or decompose the requested task into two or more subtasks in step 220. The DNS resource server 135 can break the task into commonly-available subtasks. In one embodiment, the subtasks can be subtasks that are capable for collaborating with one another. In one example, the subtasks can be capable of sharing data. At step 225, the DNS resource server 130 can search for subtasks at the resource database 135. In one example, the DNS resource server 130 can search for a subtask that is specifically oriented to providing collaboration "glue" functions for coordination of subtasks.

At step 228, if the DNS resource server 130 is not able to match the subtasks to the resources available at the resource database 135, then the DNS resource server 130 can notify the mobile device 110 that the remote resources are not available for performing the described task for the benefit of the mobile device 110 at step 236. If the subtasks are identified at the resource database 135, then the DNS resource server 130 can send IP address information to the mobile device 110 at step 232. The DNS resource server 130 can send information to the MPC 105 of the mobile device 110 to allow the MPC 105 to configure one or more bearer gateway paths for communications associated with the task and/or subtasks.

At step 240, the DNS resource server 130 can receive status information for resources that have been selected to execute tasks and/or subtasks. The DNS resource server 130 can determine, at step 244, based on the monitored information, whether a resource that provides a task or a subtask is subject to a reduced availability at step 244. For example, a task can be available but can be using many resources to provide the task to multiple mobile devices. As a result, the task can become temporarily unavailable or exhibit slow performance. If the DNS resource server 130 determines that a resource has reduced availability, at step 244, then the DNS resource server 130 can determine if an alternative resource is available at step 252. If an alternative resource is available, then the DNS resource server 130 can select the alternative resource at step 256 and this alternative resource can be used as a fail-over. If no alternative resource can be identified, then the DNS resource server 130 can notify the mobile device 110 of a processing delay due to unavailability of a resource.

FIG. 3 depicts an illustrative embodiment of a first communication system 400 for delivering media content. The communication system 300 can represent an Internet Protocol Television (IPTV) media system. Communication system 300 can be overlaid or operably coupled with system 100 of FIG. 1 as another representative embodiment of communication system 300. For instance, one or more devices illustrated in the communication system 300 of FIG. 3 can be used for managing remote resources that are accessible to mobile devices 316 in the communication network 300. A server 330 can be a DNS resource server 330 for identifying tasks or subtasks from a resource database 330, where those tasks or subtasks can be executed at a resource, such as a network element, for use by the mobile device 316.

The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via an access network 318 to commercial and/or residential buildings 302 housing a gateway 304 (such as a residential or commercial gateway). The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as a DNS resource server 330. The DNS resource server 330 can use computing and communication technology to perform function 362, which can include among other things, the techniques described by method 200 of FIGS. 2A-2B. For instance, function 362 of server 330 can be similar to the functions described for the DNA resource server 130 of FIG. 1 in accordance with method 200. The media processors 306 and wireless communication devices 316 can be provisioned with software functions 364 and 366, respectively, to utilize the services of the DNS resource server 330. For instance, the functions 366 of the wireless communication devices 316 can be similar to the functions described for the mobile device 110 of FIG. 1 in accordance with method 200.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with system 100 of FIG. 1 and communication system 300 as another representative embodiment of communication system 400. The communication system 400 can include a DNS resource server 430 that can receive a request from a mobile device 405 for a task to be remotely-performed for the mobile device 405. The request can include a task description. The DNS resource server 430 can identify from a resource database 435 resources that are capable for collaborative performance of the task. The DNS resource server 430 can send a network address to the mobile device 405 for accessing the resources.

Communication system 400 can comprise a Home Subscriber Server (HSS) 440, a tElephone NUmber Mapping (ENUM) server 434, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 434 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 434 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The DNS resource server 430 of FIG. 4 can be operably coupled to communication system 400 for purposes similar to those described above. DNS resource server 430 can perform function 462 and thereby provide resource identification services to the CDs 401, 402, 403 and 405 of FIG. 4 similar to the functions described for DNS resource server 130 of FIG. 1 in accordance with method 200 of FIGS. 2A-2B. CDs 401, 402, 403 and 405, which can be adapted with software to perform function 472 to utilize the services of the DNS resource server 430 similar to the functions described for communication devices 100 of FIG. 1 in accordance with method 200 of FIGS. 2A-2B. DNS resource server 430 can be an integral part of the application server(s) 417 performing function 474, which can be substantially similar to function 364 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
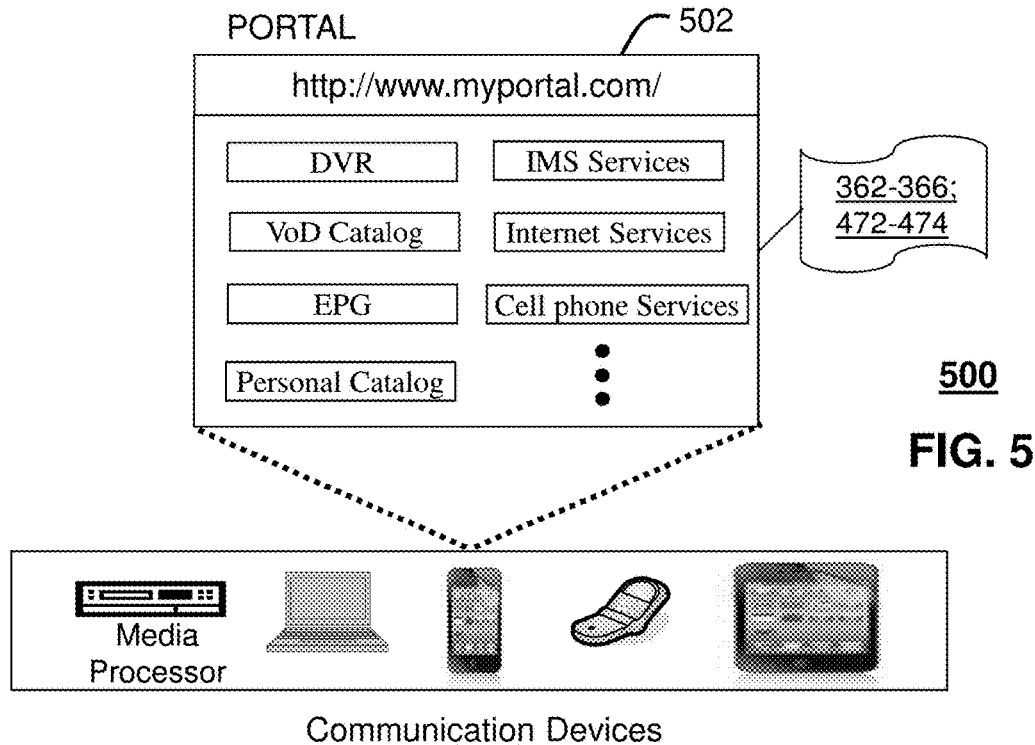
FIG. 5 depicts an illustrative embodiment of a web portal for interacting with the communication systems of FIGS. 1 and 3-4.

FIG. 5 depicts an illustrative embodiment of a web portal 502 of a communication system 500. Communication system 500 can be overlaid or operably coupled with system 100 of FIG. 1, communication system 300, and/or communication system 400 as another representative embodiment of systems 100 of FIG. 1, communication system 300, and/or communication system 400. The web portal 502 can be used for managing services of system 100 of FIG. 1 and communication systems 300-400. A web page of the web portal 502 can be accessed by a Uniform Resource Locator (URL) with an Internet browser using an Internet-capable communication device such as those described in FIG. 1 and FIGS. 3-4. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-474 to adapt these applications as may be desired by subscribers and/or service providers of system 100 of FIG. 1, and communication systems 300-400. For instance, users of the services provided by server 130 or server 330 can log into their on-line accounts and provision the servers 130 or server 330 and allow a user of a mobile device 110 to edit user profiles, provide contact information to server 130 to enable it to communication with devices described in FIGS. 1 and 3-4, and so on. Service providers can log onto an administrator account to provision, monitor and/or maintain the system 100 of FIG. 1 or server 130.

Figure 6:
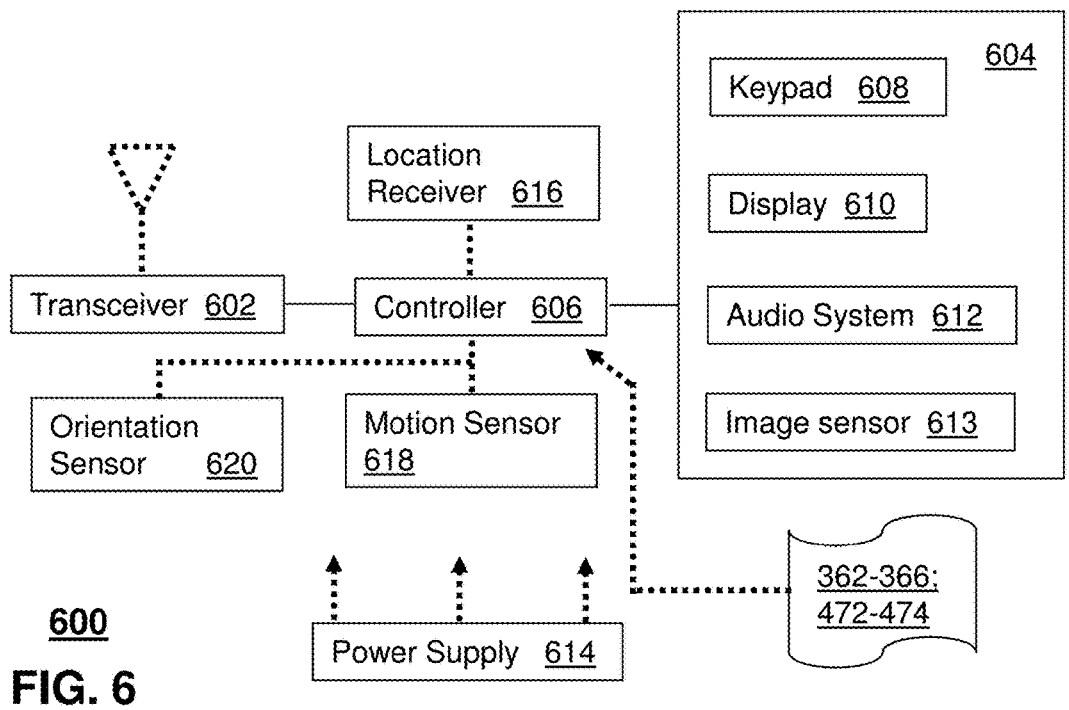
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIGS. 3-4 and can be configured to perform portions of method 200 of FIGS. 2A-2B.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 600 can also represent other devices that can operate in a system of FIG. 1, communication systems 300-400 of FIGS. 3-4 such as a gaming console and a media player. In addition, the controller 606 can be adapted in various embodiments to perform the functions 362-366 and 472-474, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
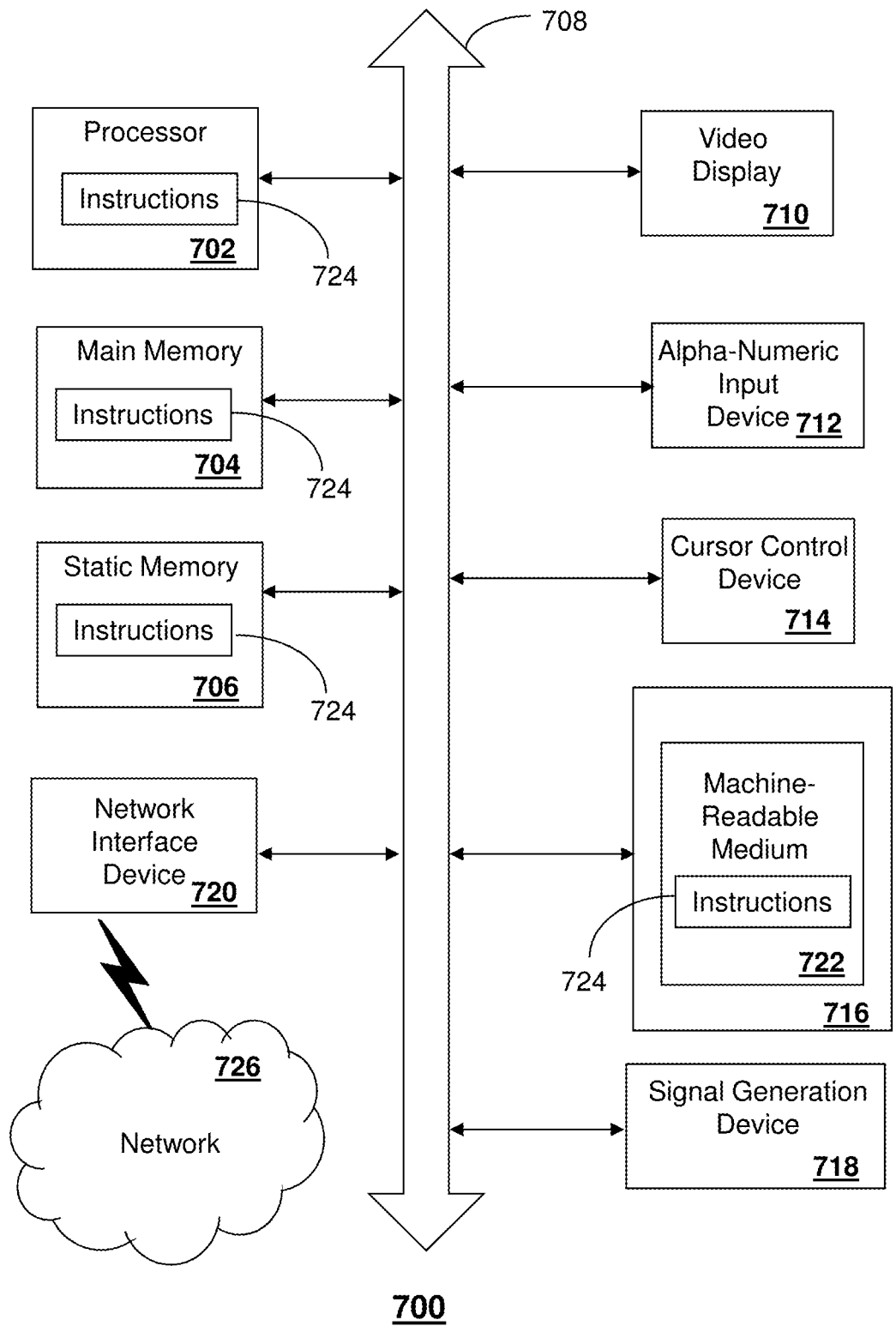
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the DNS resource server 130, resource database 135, and/or the mobile devices 110 and other devices of FIGS. 1 and 3-4. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A domain name server device, comprising:
   a processor comprising hardware; and
   a memory storing executable instructions that, when executed by the processor, perform operations, comprising:
   receiving, from a mobile communication device over a network, a request comprising a description of a task to be performed for the mobile communication device;
   identifying, via a resource database, a first resource and a second resource according to the description of the task, wherein the first resource coordinates performance of the task with the second resource;
   sending a first network address of the first resource to the mobile communication device for accessing the first resource via the network;
   storing, at the resource database, capability information associated with a resource operating at the mobile communication device;
   receiving, from a second mobile communication device over the network, a second request comprising a second description of a second task to be performed for the second mobile communication device;

identifying, at the resource database, the resource of the mobile communication device according to the second description of the second task; and sending a second network address of the resource of the mobile communication device to the second mobile communication device for accessing the resource of the mobile communication device via the network.

2. The domain name server device of claim 1, wherein the first resource operates at a second mobile communication device that is accessible via the network.

3. The domain name server device of claim 2, wherein the operations further comprise:

receiving, from the first resource, an indication of reduced availability for the second resource;

identifying a third resource at the resource database responsive to the indication of the reduced availability; and directing the first resource to coordinate performance of the task with the third resource.

4. The domain name server device of claim 1, wherein the operations further comprise sending a second network address of the second resource to the mobile communication device for accessing the second resource via the network.

5. The domain name server device of claim 1, wherein the operations further comprise:

determining first bearer path gateway information for the mobile communication device for communication with the first resource; and transmitting the first bearer path gateway information to a mobility management entity associated with the mobile communication device, wherein the mobility management entity establishes the first bearer path gateway for communications associated with performance of the task for the mobile communication device.

6. The domain name server device of claim 5, wherein the operations further comprise:

determining second bearer path gateway information for the mobile communication device for communication with the second resource; and transmitting the second bearer path gateway information to the mobility management entity associated with the mobile communication device, wherein the mobility management entity establishes the second bearer path gateway for communications associated with performance of the task for the mobile communication device.

7. The domain name server device of claim 1, wherein the operations further comprise decomposing the task into a first subtask and a second subtask according to the description of the task, wherein the identifying of the first resource is based on a first subtask description for the first subtask, and wherein the identifying of the second resource is based on a second subtask description for the second subtask.

8. The domain name server device of claim 7, wherein the first resource coordinates performance of the first subtask with performance of the second subtask by the second resource.

9. The domain name server device of claim 1, wherein the description of the task further comprises a first subtask description for a first subtask and a second subtask description for a second subtask, and wherein the operations further comprise composing the description of the task from the first subtask description and the second subtask description.

10. The domain name server device of claim 1, wherein the operations further comprise transmitting to a plurality of mobile communication devices a plurality of capability information associated with a plurality of resources, wherein the plurality of information is stored at the resource database.

11. The domain name server device of claim 1, wherein the operations further comprise:

identifying a keyword from the description of the task;

searching the resource database according to the keyword; and identifying the first resource, the second resource or both based on a match between the keyword and one of a capability of a resource to perform the task, a requirement of the resource to perform the task, or a combination thereof.

12. The domain name server device of claim 1, wherein the operations further comprise:

detecting an availability of a third resource for performing the task;

identifying the third resource for performance of the task for the mobile communication device, wherein the first resource coordinates performance of the task with the second resource, and the third resource; and sending a second network address of the third resource to the mobile communication device for accessing the third resource via the network.

13. The domain name server device of claim 12, wherein the operations further comprise transmitting bearer path gateway information to a mobility management entity associated with the mobile communication device, wherein the mobility management entity facilitates establishment of the bearer path gateway for enabling communications by the mobile communication device to perform the task at least in part by way of the third resource.

14. A computer-readable storage device comprising executable instructions which, responsive to being executed by a system including a processor, perform operations comprising:

identifying, from a description received from a mobile device of a task to be performed for the mobile device, a first sub-function and a second sub-function to perform a collective function for the mobile device;

identifying, via a resource database, a first resource for performing the first sub-function and a second resource for performing the second sub-function, wherein the collective function is performed by coordinating use of the first resource and the second resource;

sending a network address of the first resource and a network address of the second resource to the mobile device for accessing the first resource and the second resource via the network;

storing, at the resource database, capability information associated with a resource operating at the mobile device;

receiving, from a second mobile device over the network, a second request comprising a second description of a second task to be performed for the second mobile device;

identifying, at the resource database, the resource of the mobile device according to the second description of the second task; and sending a second network address of the resource of the mobile device to the second mobile device for accessing the resource of the mobile device via the network.

15. The computer-readable storage device of claim 14, wherein the operations further comprise:

determining a first bearer path for the mobile device for communicating with the first resource; and transmitting information for the first bearer path to a mobility management entity associated with the mobile device, wherein the mobility management entity facilitates the first bearer path.

16. The computer-readable storage device of claim 14, wherein the operations further comprise:

receiving, from the first resource, an indication of reduced availability for the second resource;

identifying a third resource at the resource database responsive to the indication of the reduced availability; and directing the first resource to coordinate performance of the collective function with the third resource.

17. A method, comprising:

determining by a system including a processor, based on a description received from a mobile device of a task to be performed for the mobile device, whether a resource identified in a resource database is capable of performing the task;

responsive to determining that the resource identified in the resource database is capable of performing the task: communicating by the system with the mobile device to facilitate the mobile device accessing the resource; and responsive to determining that the resource identified in the resource database is not capable of performing the task:

identifying, by the system, a first subtask from a second subtask to generate a collective task to be performed for the mobile device, wherein the first subtask and the second subtask are associated respectively with a first resource and a second resource identified from a database of available resources for performing the collective task; and determining, by the system, a bearer path for enabling the first resource to coordinate with the second resource to perform the collective task, wherein the first resource performs the first subtask, and wherein the second resource performs the second subtask.

18. The method of claim 17, further comprising:

identifying, by the system, a local resource of the mobile device; and sending, by the system, a network address of the local resource to a second mobile device for accessing the local resource via a network.

19. The method of claim 17, further comprising:

identifying, by the system, a keyword from a description of the collective task;

searching, by the system, the resource database according to the keyword to generate search results; and identifying, by the system, the first resource, the second resource or both based on the search results.

* * * * *